US008261249B2

(12) United States Patent  
Archer et al.

(10) Patent No.: US 8,261,249 B2
(45) Date of Patent: Sep. 4, 2012

(54) DISTRIBUTED SCHEMES FOR DEPLOYING AN APPLICATION IN A LARGE PARALLEL SYSTEM

(75) Inventors: Charles Jens Archer, Rochester, MN (US); Thomas Michael Gooding, Rochester, MN (US); Ruth Janine Poole, Rochester, MN (US); Albert Sidelnik, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 11/971,006

(22) Filed: Jan. 8, 2008

(65) Prior Publication Data

US 2009/0178053 A1 Jul. 9, 2009

(51) Int. Cl.
*G06F 9/45* (2006.01)
*G06F 9/46* (2006.01)
*G06F 15/16* (2006.01)
*G06F 15/173* (2006.01)

(52) U.S. Cl. ........ 717/149; 718/102; 718/104; 717/150; 717/159; 717/160; 717/161; 709/201; 709/226

(58) Field of Classification Search .............. 709/201, 709/202, 208, 209, 211; 708/102, 104, 107; 717/149, 150, 159–161
See application file for complete search history.

(56) References Cited

U.S. PATENT DOCUMENTS

| | | | | |
|---|---|---|---|---|
| 5,349,682 A * | 9/1994 | Rosenberry | ................... | 718/102 |
| 5,978,583 A * | 11/1999 | Ekanadham et al. | ......... | 717/106 |
| 6,801,943 B1 * | 10/2004 | Pavan et al. | ................... | 709/226 |
| 7,080,204 B2 * | 7/2006 | Kim | ............................... | 711/118 |
| 7,370,156 B1 * | 5/2008 | Nguyen et al. | ................. | 711/147 |
| 7,831,801 B1 * | 11/2010 | Anderson | ........................ | 712/11 |
| 2004/0158825 A1 * | 8/2004 | Kim | ............................... | 717/148 |
| 2005/0240930 A1 * | 10/2005 | Amamiya et al. | ............ | 718/100 |
| 2007/0079303 A1 * | 4/2007 | Du et al. | ........................ | 717/151 |
| 2008/0115139 A1 * | 5/2008 | Inglett et al. | ................... | 718/102 |
| 2008/0127146 A1 * | 5/2008 | Liao et al. | ...................... | 717/150 |
| 2008/0178165 A1 * | 7/2008 | Baker | ........................... | 717/149 |
| 2008/0178177 A1 * | 7/2008 | Archer et al. | ................. | 718/100 |
| 2008/0222620 A1 * | 9/2008 | Little et al. | ..................... | 717/149 |
| 2008/0301683 A1 * | 12/2008 | Archer et al. | ................. | 718/102 |
| 2009/0012982 A1 * | 1/2009 | Merchia et al. | ............... | 707/101 |
| 2009/0031175 A1 * | 1/2009 | Aggarwal et al. | ............... | 714/47 |
| 2009/0037377 A1 * | 2/2009 | Archer et al. | ..................... | 707/3 |
| 2009/0064168 A1 * | 3/2009 | Arimilli et al. | ............... | 718/105 |
| 2009/0089013 A1 * | 4/2009 | Gooding et al. | ............... | 702/186 |
| 2009/0113438 A1 * | 4/2009 | Barness et al. | ................ | 718/103 |
| 2009/0125883 A1 * | 5/2009 | Barsness et al. | ............. | 717/119 |
| 2009/0158276 A1 * | 6/2009 | Barsness et al. | ............. | 718/100 |

OTHER PUBLICATIONS

J. Li et al, "Compiling Communication-Efficient Programs for Massively Parallel Machines", IEEE Transactions on Parallel and Distributed Systems, vol. 2, No. 3, Jul. 1991, pp. 361-376.
http://cs.gmu.edu/cne/modules/dsm/yellow/page_dsm.html, "Page Based Distributed Shared Memory", pp. 1-2, printed Jan. 8, 2008.

* cited by examiner

*Primary Examiner* — Larry Donaghue
*Assistant Examiner* — Aftab Nasir Khan
(74) *Attorney, Agent, or Firm* — Patterson & Sheridan, LLP

(57) ABSTRACT

Embodiments of the invention provide a method for deploying and running an application on a massively parallel computer system, while minimizing the costs associated with latency, bandwidth, and limited memory resources. The executable code of a program may be divided into multiple code fragments and distributed to different compute nodes of a parallel computing system. During program execution, one compute node may fetch code fragments from other compute nodes as necessary.

18 Claims, 8 Drawing Sheets

DISTRIBUTED SCHEMES FOR DEPLOYING AN APPLICATION IN A LARGE PARALLEL SYSTEM

BACKGROUND OF THE INVENTION

1. Field of the Invention

The present invention generally relates to data processing and more particularly to a method for deploying and running an application on a massively parallel computer system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

The compute nodes in a parallel system typically communicate with one another over multiple communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Other parallel architectures also use MPI and ARMCI for data communication between compute nodes connected via a variety of network topologies. Typically, MPI messages are encapsulated in a set of packets which are transmitted from a source node to a destination node over a communications network (e.g., the torus network of a Blue Gene system).

SUMMARY OF THE INVENTION

One embodiment of the invention includes a method of executing an application program on a parallel computing system having a plurality of compute nodes. The method may generally include receiving a program binary executable by each of the plurality of compute nodes, dividing the program binary into a plurality of code fragments, and distributing each of the plurality of code fragments to at least one of the plurality of compute nodes. Once distributed, the application program on each of the plurality of compute nodes may be executed.

In a particular embodiment, the method may further include receiving, by a first compute node, one or more of the code fragments and storing the one or more code fragments in a memory space of the first compute node. Further, during execution of the application program, a second compute node may request a code fragment in the memory space of the first compute node. In response, the requested code fragment is transmitted to the second compute node. The second code fragment may be received by the second compute node and stored in a memory space of the second compute node. If necessary, prior to storing the received code fragment in the memory space of the second compute node, the second compute node may evict a code fragment from the memory space of the second compute node.

Another embodiment of the invention includes a computer readable storage medium containing a program which, when executed, performs an operation. The operation may generally include receiving a program binary executable by each of the plurality of compute nodes, dividing the program binary into a plurality of code fragments, and distributing each of the plurality of code fragments to at least one of the plurality of compute nodes. Once distributed, the application program on each of the plurality of compute nodes may be executed.

Still another embodiment of the invention includes a parallel computing system. The system may generally include a plurality of compute nodes, each having at least a processor and a memory. Each of compute nodes is configured to execute a parallel computing application. The system may also include a service node having at least a processor, a memory, and a code fragmentor program. The code fragmentor program may generally be configured to receive a program binary executable by each of the plurality of compute nodes, divide the program binary into a plurality of code fragments, and distribute each of the plurality of code fragments to at least one of the plurality of compute nodes. Once distributed, the application program on each of the plurality of compute nodes may be executed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
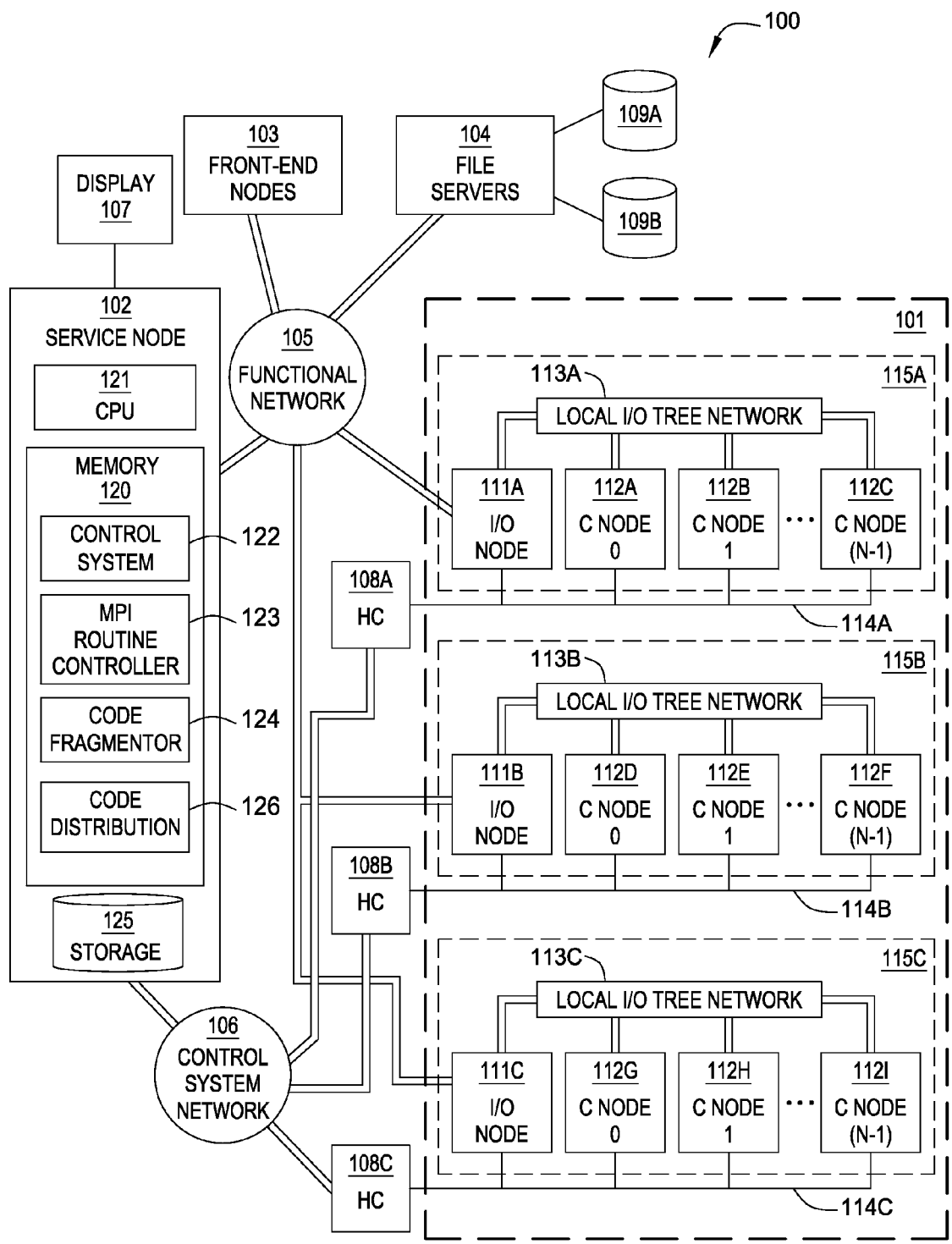
FIG. 1 is a high-level block diagram of components of a massively parallel computer system, according to one embodiment of the present invention.

Distributed systems, such as a Blue Gene system, provide tremendous computing power by coordinating the activity of thousands of processors. Each processor, however, may frequently be configured with a relatively small amount of local memory. Therefore, programs which execute on multiple nodes may not have enough memory available after loading an application to perform complex computations. One common way to solve this problem is to distribute the application onto each compute node, and let the operating system (referred to as a compute node kernel) page portions of the application into and out of memory present on that node. This approach is costly because of the latency and limited bandwidth associated with network and disk access.

Embodiments of the invention provide a method for deploying and running an application on a massively parallel computer system, while minimizing the costs associated with latency, bandwidth, and limited memory resources. For example, embodiments of the invention may be used to divide program executable code (including read-only data and text) into multiple code fragments which can be stored and run on different nodes of a parallel computing system, such as the Blue Gene architecture developed by IBM. Of course, embodiments of the invention may be adapted for use with other parallel systems as well.

In one embodiment, a fragment cache may store the particular code fragments distributed to a compute node. The fragments in the fragment cache may include portions of program code, text or read only data. Each fragment remains unaltered while the application is running. While the compute node executes the application, the program code in various code fragments may be needed. If, during execution, the next instruction to be executed is in a fragment that is not in the fragment cache, then the location of that fragment may be identified (e.g., using a translation lookaside buffer (TLB). The compute node then requests the fragment from the node identified by the TLB and stores the fragment in the fragment cache (evicting another fragment if necessary). The program then resumes execution.

The code fragments may be distributed using a variety of schemes. In one embodiment, the user specifies which particular compute nodes to store each fragment. In another embodiment, a round-robin scheme is used to distribute each fragment. For example, once a fragment is loaded into a node, the closest available node is used to load the next fragment into, and so on. In yet another embodiment, a profile-driven scheme is used to distribute the fragments. For example, according to one profile, multiple copies of the same fragment may be stored in nodes that are physically spread throughout the system. This approach alleviates network congestion, because the closer nodes are to each other, the faster they can transfer data (since the data traverses fewer nodes). Further, because each fragment is always present on some node, latency for paging form a disk may effectively be eliminated, thereby increasing application performance, while allowing larger programs to effectively be executed on the distributed system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

Illustratively, memory 120 of service node 102 includes a code fragmentor 124 and a code distributor 126. In one embodiment, code fragmentor 124 may be configured to divide an executable program into a collection of fragments. The fragment size may be manually configured or computed by code fragmentor 124, based on the size of memory in compute nodes 112. Once an application has been fragmented by code fragmentor 124, code distributor 126 may distribute the fragments to the compute nodes selected to execute the application, according to a distribution scheme. Examples of distribution schemes include pre-determined, round-robin, and profile-driven, which are described in more detail below. In one embodiment, each node may have a first portion of memory dedicated to store one or more fragments and a second portion of memory available for fragments to be paged in (and out) from other compute nodes.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
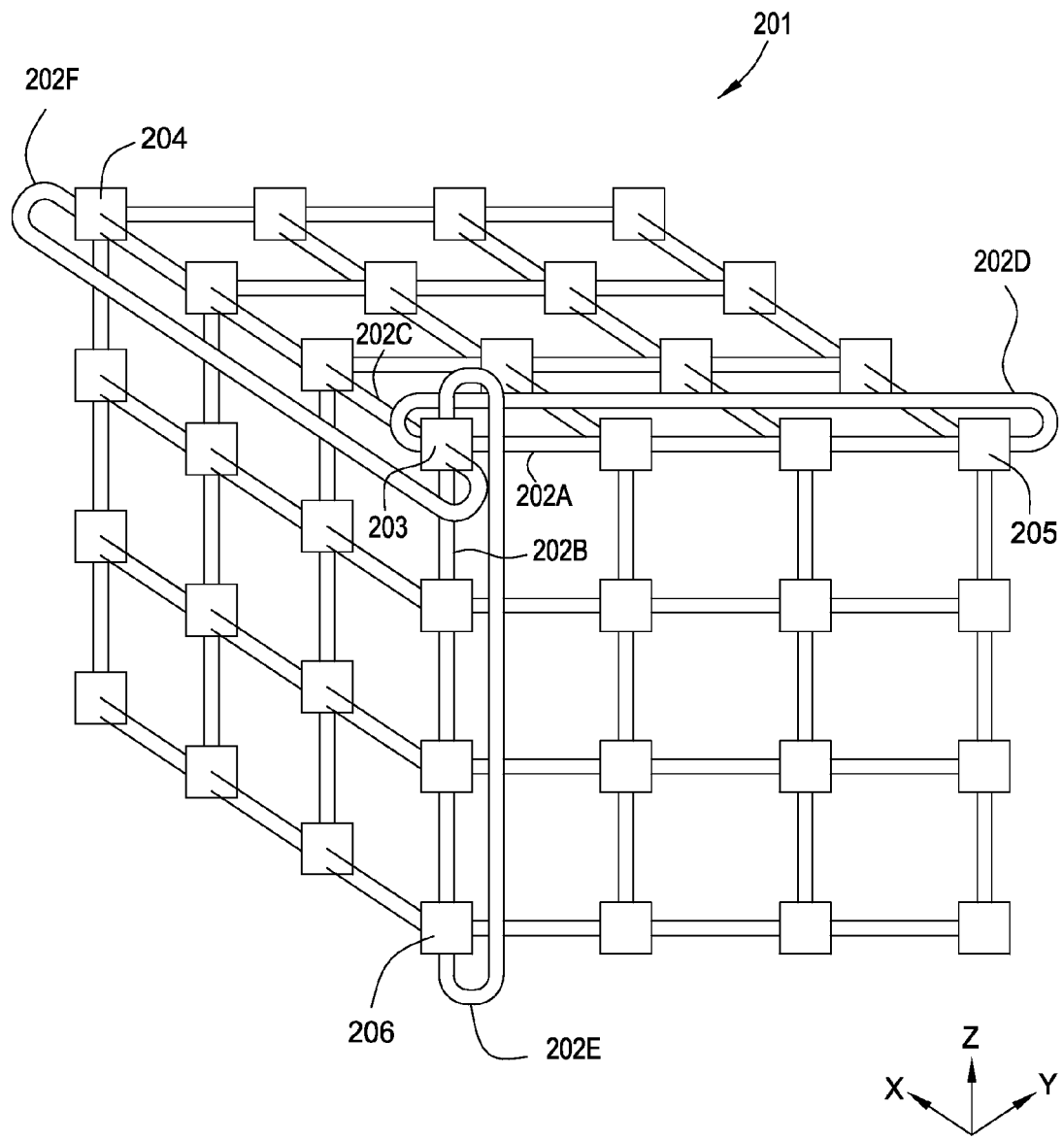
FIG. 2 is a conceptual illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
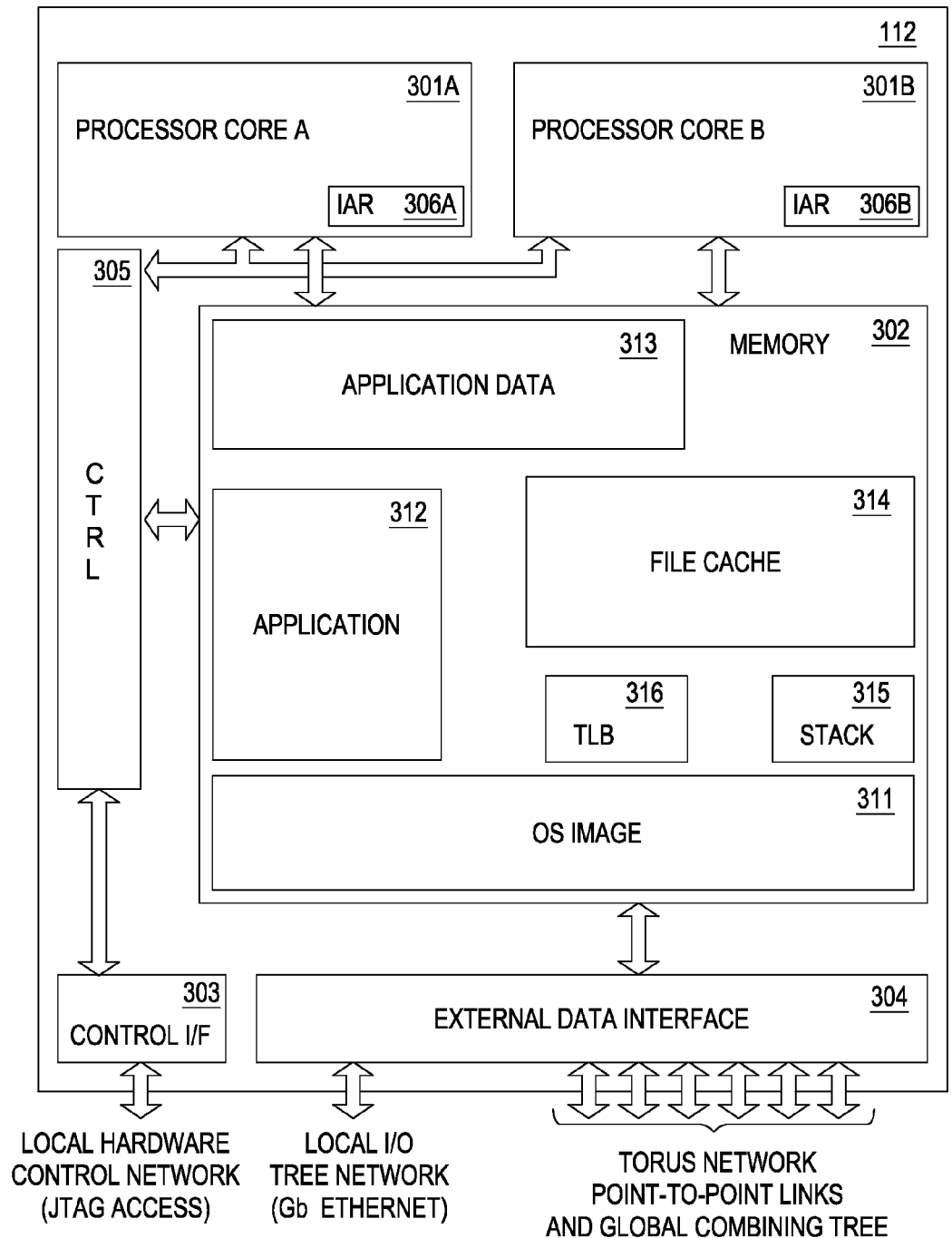
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313, as required. Illustratively, memory 302 also includes a file cache 314, i.e., a cache of data read from or to be written to an I/O file. Operating system image 311 provides a copy of a simplified-function operating system running on compute node 112, referred to as a compute node kernel. Operating system image 311 may include a minimal set of functions required to support operation of the compute node 112. In a Blue Gene system, for example, operating system image 311 contains a version of the Linux®-like operating system customized to run on compute node 112. Of course, other operating systems may be used, and further, it is not necessary that all nodes employ the same operating system. (Also note, Linux® is a registered trademark of Linus Torvalds in the United States and other countries.)

Application code image 312 represents a copy of the parallel program being executed by compute nodes 112. Application code image 302 may include a copy of a computer program being executed by multiple compute nodes 112, but where the program is very large and/or complex, it may be subdivided into code fragments which are distributed to different compute nodes 112 to cooperate and, collectively, accomplish a parallel computing task. If a required code fragment does not exist in local memory, the TLB 316 (translation look-aside buffer) may provide the location of the node that contains the fragment. The fragment is then fetched from the remote node and stored in local memory. Then execution continues. Memory 302 may also include a call-return stack 315 for storing the states of procedures which must be returned to, which is shown separate from application code image 302, although it may be considered part of application code state data.

As part of ongoing operations, application 312 may be configured to transmit messages from compute node 112 to other compute nodes in parallel system 100. For example, the MPI call of MPI_Send( ); may be used by application 312 to transmit a message from one compute node to another. On the other side of the communication, the receiving compute node may use the MPI call MPI_Receive( ); to receive the message. For example, in context of the present invention, one compute node may use MPI messages to send a request to another a compute for a needed program fragment. As described above, in a Blue Gene system, the external data interface 304 transmits the MPI message by encapsulating it within a set of packets and transmitting the packets of over the torus network of point-to-point links. Other parallel systems and other parallel computing libraries use similar mechanisms for transmitting messages between different compute nodes.

Figure 4:
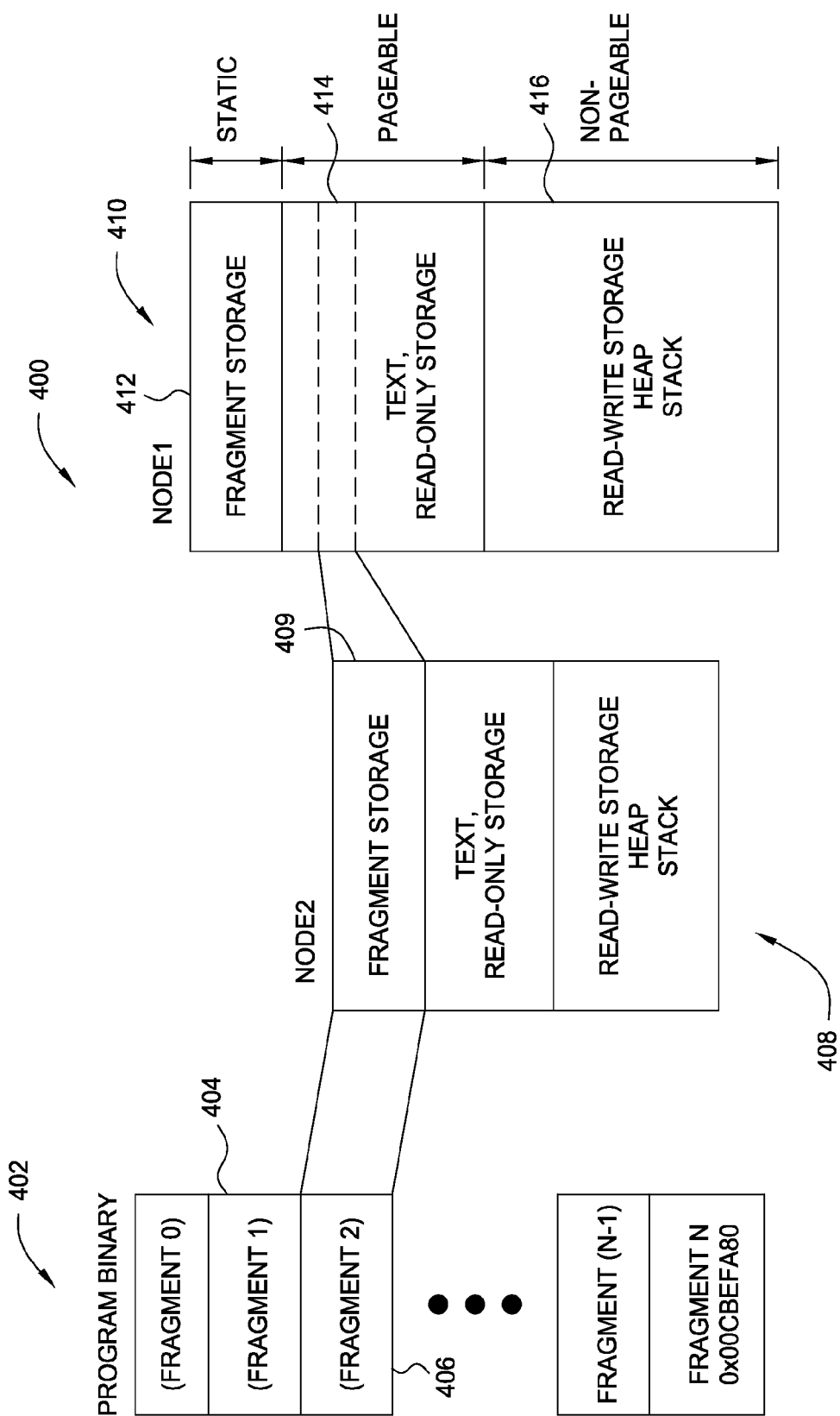
FIG. 4 is a diagram of the an allocation of a node's memory in a compute node of a parallel system, according to one embodiment of the invention.

FIG. 4 is a diagram 400 of a memory allocation on compute nodes 408 and 410, according to one embodiment of the invention. As shown, the diagram 400 includes a memory 412 representing the memory on a first compute node 410. Diagram 400 also includes a second compute node 408, and a program binary 402. Memory of first compute node 110 includes fragment storage 412, pageable memory 414, and non-pageable memory 416. Fragment storage 412 provides space used to store fragments distributed by code distributor 126. Pageable memory 414 stores program fragments paged-in from other nodes as needed, and non-pageable memory 416 provides a memory area used by a program binary 402 for writeable operations, i.e., a memory storing data and/or program code that may not be paged out.

As shown, program binary 402 has been divided into fragments. The fragments may be distributed to a group of compute nodes selected to execute program binary 402. Illustratively, fragment 1 404 is stored in the fragment storage 412 of the first compute node 410 and fragment 2 406 is stored in the fragment storage 409 of the second compute node 408. At some point, during normal program execution first compute node 410 may execute the code contained in fragment storage 412. If instructions from fragment 2 406 are required, then a page-fault occurs, because fragment 2 is not stored in the memory of node 412. The fragment 2 406 may be fetched from node 408 and stored in the pageable memory 414. Then, the program resumes execution on compute node 410.

Figure 5:
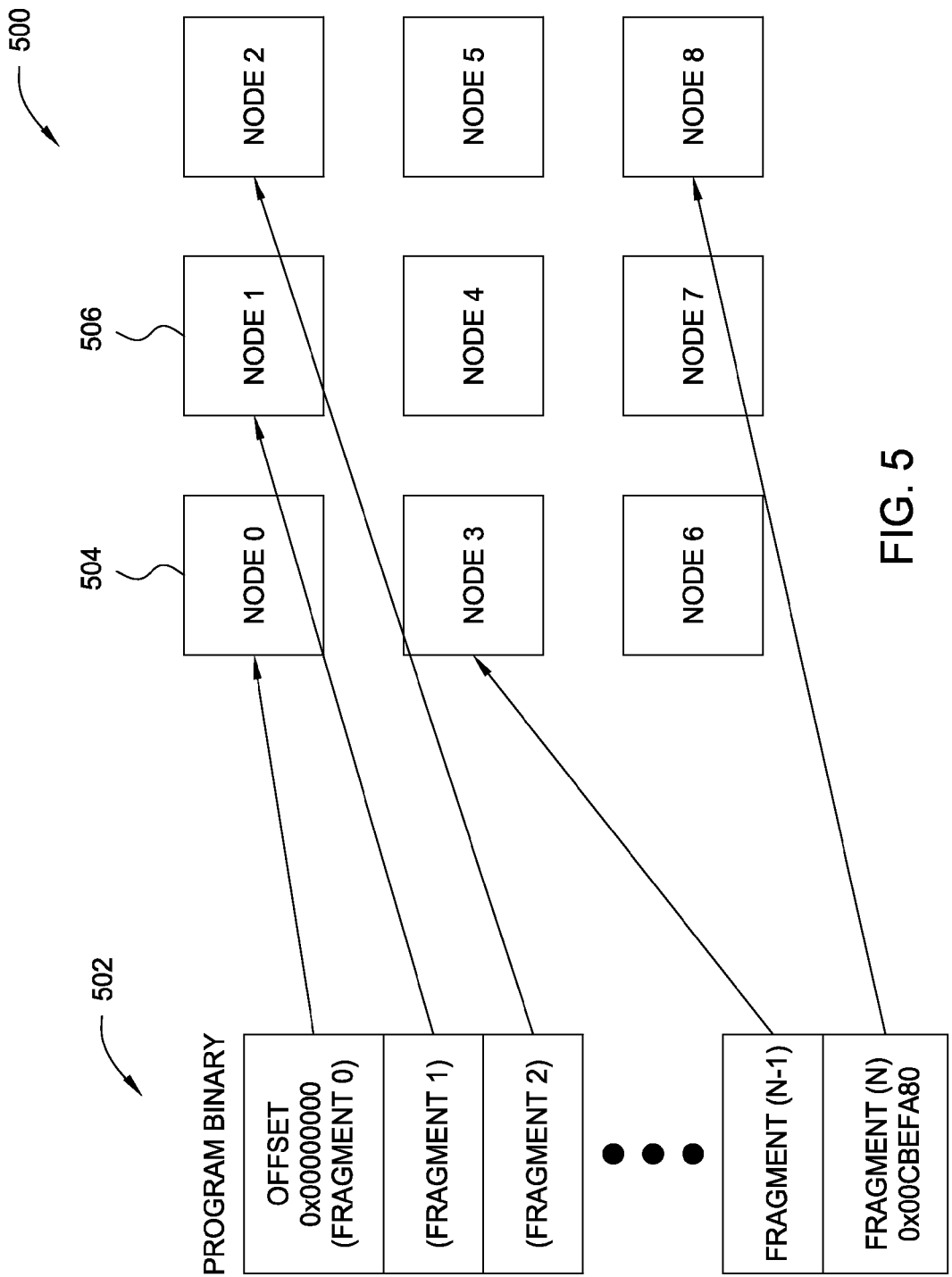
FIG. 5 is a conceptual illustration of a program's executable code that is distributed among compute nodes of a parallel system using a pre-determined scheme, according to one embodiment of the invention.

FIG. 5 is a conceptual illustration 500 of a program binary 502 distributed among compute nodes of a parallel system using a pre-determined scheme, according to one embodiment of the invention. As show the program binary 502 has been divided into fragments, e.g., by the code fragmentor 124 of FIG. 1. Each fragment is stored in a different node, pre-determined by the user. In this example, the first fragment from the executable code 502 is stored in node0 504, the second fragment is stored in node1 506, and so on. In this example, each node stores a single code fragment and may page in additional fragments from other nodes as necessary. Of course, other pre-determined distribution schemes could store more fragments at each individual nodes, depending on the memory available on the compute nodes, the size of the fragments, etc. For example, fragments representing program startup and initialization, which would be executed by each node, could be distributed to each node, while other programs representing specialized functions could be distributed to nodes expected to execute such specialized functions.

Figure 6:
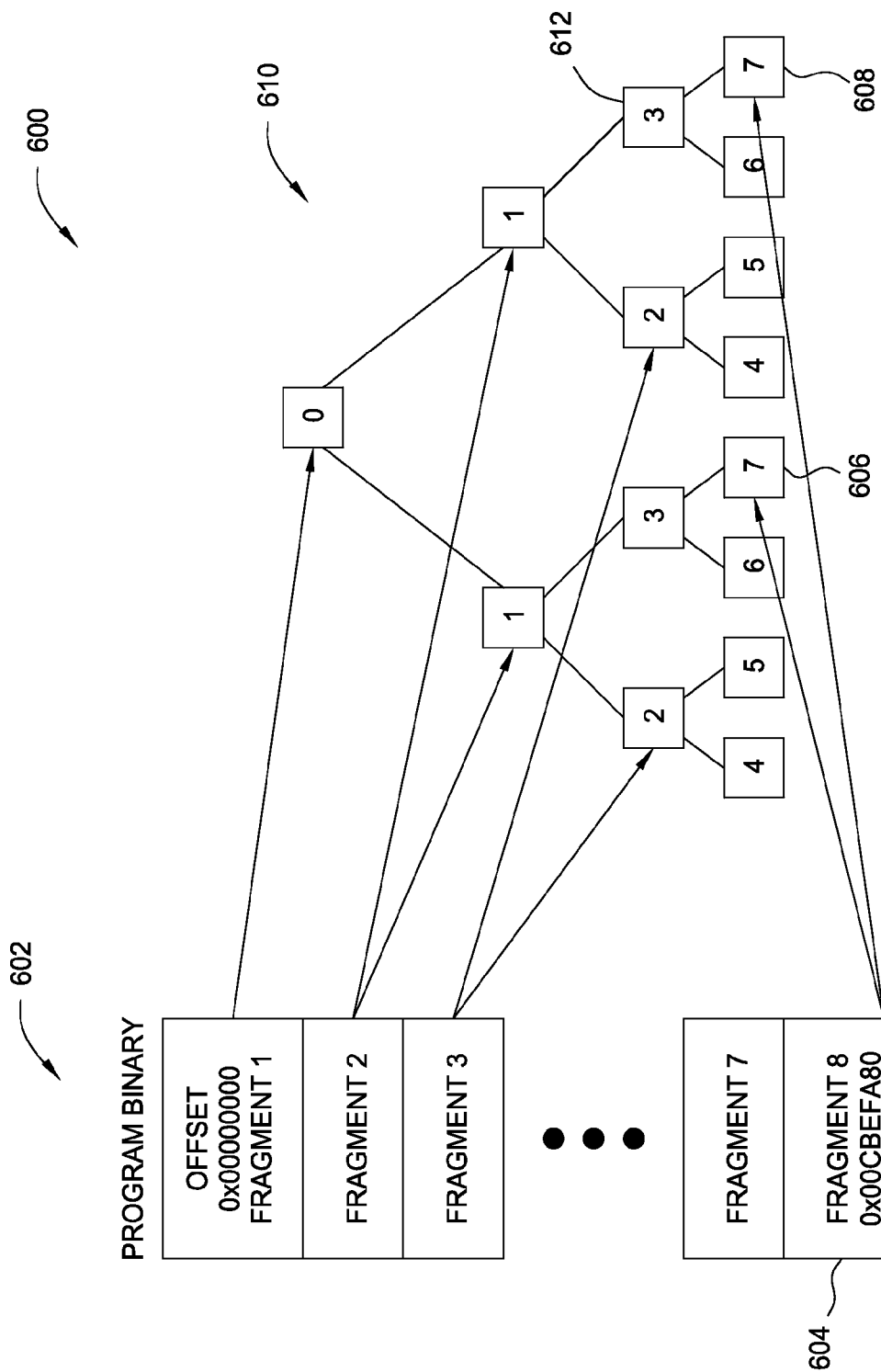
FIG. 6 is a conceptual illustration of a program's executable code that is distributed among compute nodes of a parallel system using a profile that implements duplication of fragments on multiple nodes, according to one embodiment of the invention.

FIG. 6 is a conceptual illustration 600 of executable code distributed among compute nodes 610 of a parallel system using a profile that implements duplication of fragments on multiple nodes, according to one embodiment of the invention. As shown, a program binary 602 has been divided into a collection of fragments. In this example, compute nodes 610 are connected by communication links forming a binary tree. Further, fragments of program binary 602 dare distributed to multiple nodes. Doing so may alleviate network congestion created by nodes fetching fragments from other nodes. For example, fragment 7 604 is distributed to a node 606 in the left branch of the tree and a node 608 in the right branch. Thus, if node 612 needs to fetch fragment 7 604, then less network bandwidth is required to fetch this fragment from node 606 than from node 608, since fewer nodes are traversed (one versus five). For the same reason, the time to retrieve the fragment is reduced. Of course, nodes may be linked together in ways other than a binary tree.

Figure 7:
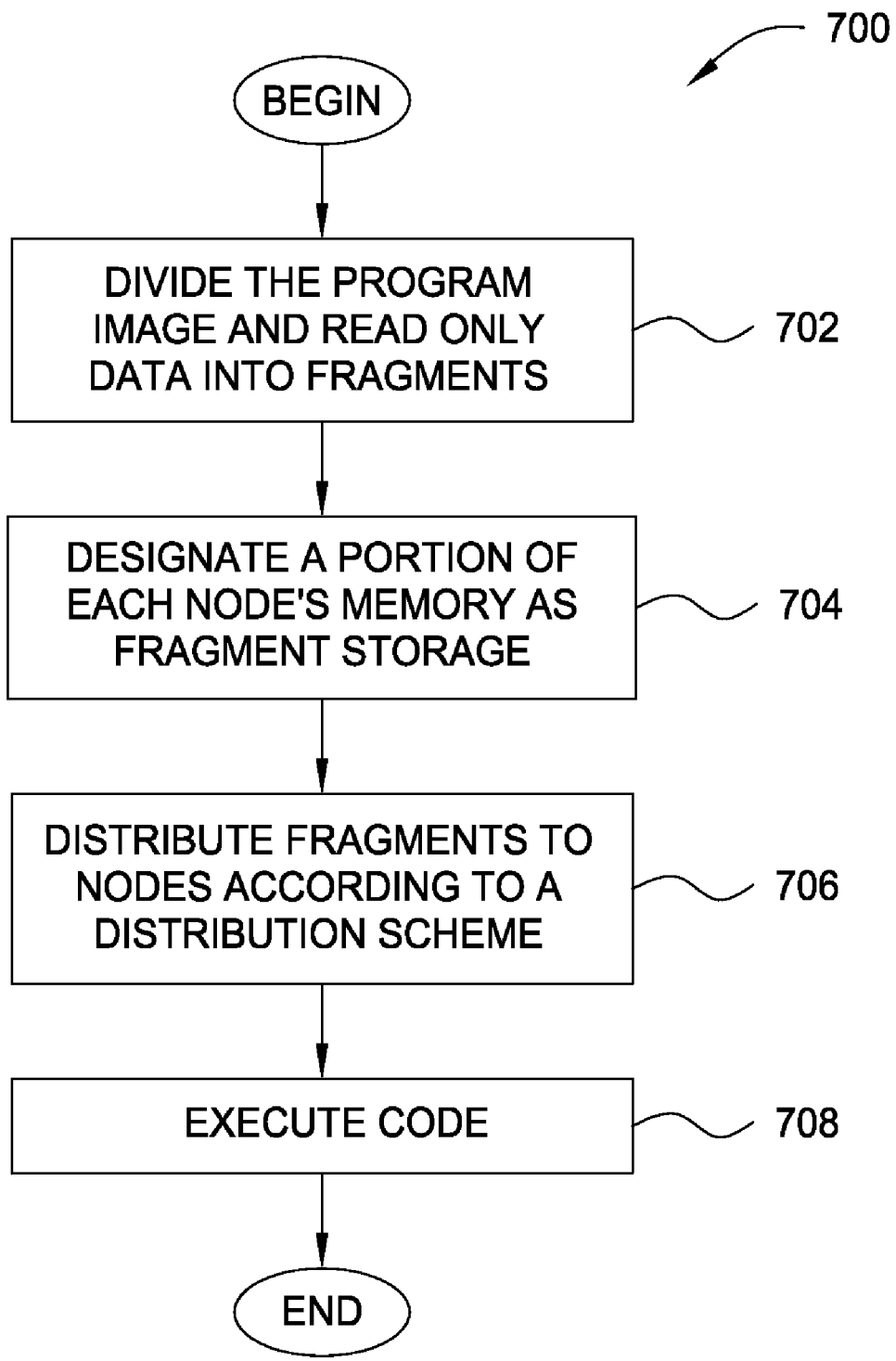
FIG. 7 is a flow diagram illustrating a method for distributing a program's executable program code among multiple compute nodes of a parallel system, according to one embodiment of the invention.

FIG. 7 is a flow diagram illustrating a method 700 for distributing code fragments among multiple nodes, according to one embodiment of the invention. As shown the method 700 begins at step 702 where, the program image (i.e., the program binary) and associated read only data is divided into fragments. At step 704, an area of each compute node on selected to execute and the program may be reserved as fragment storage. At step 706, the fragments generated at step 702 are distributed to the compute nodes, according to a distribution scheme. Examples of distribution schemes include pre-determined, round-robin, and profile-driven. Once the fragments are distributed. The fragments are then transmitted by the code fragment distributor to the compute nodes. Alternatively the fragment distributor may transmit a message informing the each individual compute node which fragments have been assigned to that node. In response, the compute node kernel may request those fragments over a network communication link (e.g. by sending a message to the I/O node, which in turn retrieves the fragments from disk and forwards them to the requesting node). At step 708, the code is executed on the compute nodes of the parallel system.

Figure 8:
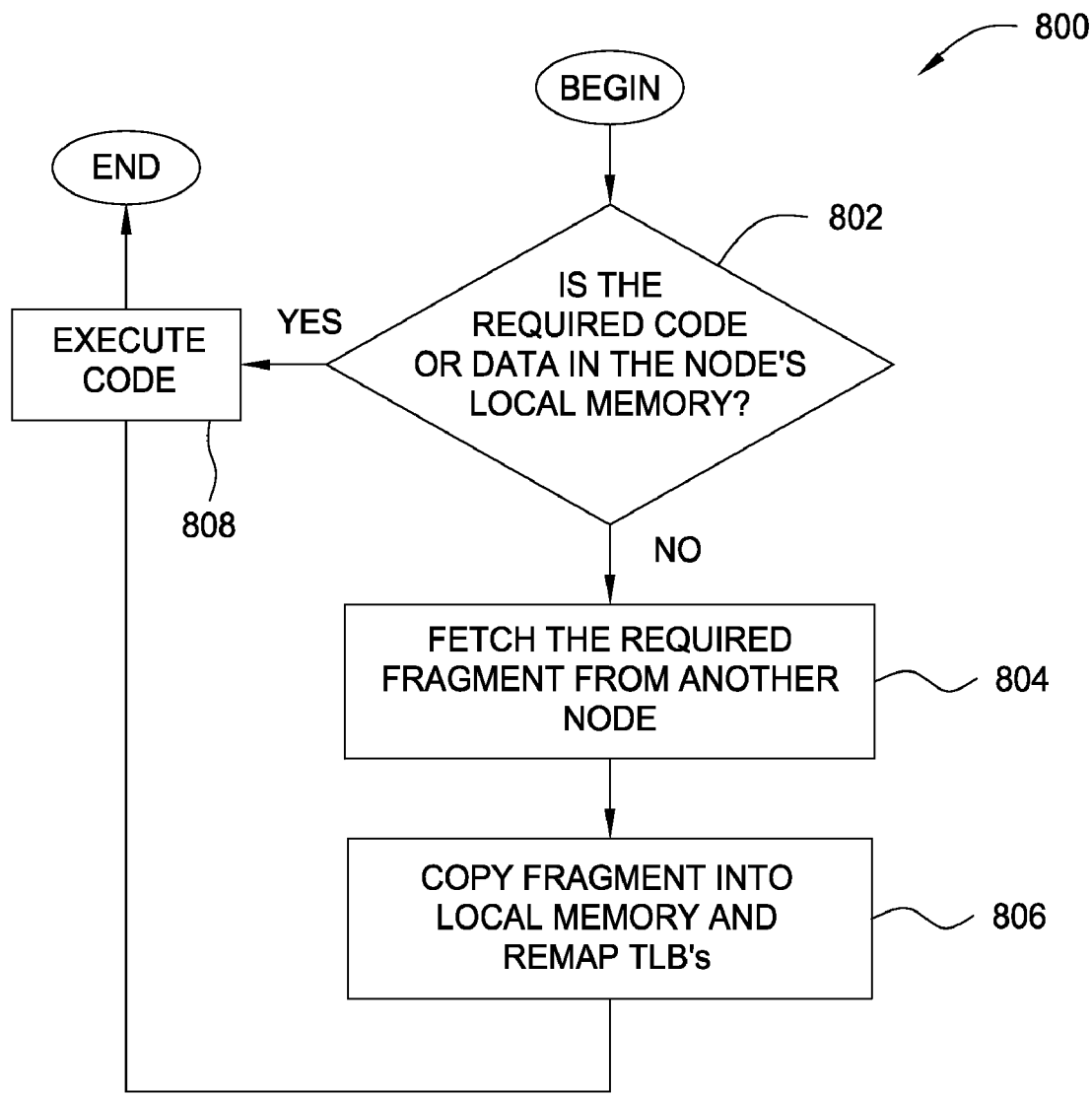
FIG. 8 is a flow diagram illustrating a method for a compute node to execute an application that has been distributed across multiple nodes of a parallel computing system, according to one embodiment of the invention.

FIG. 8 is a flow diagram illustrating a method 800 for a compute node to execute an application that has been distributed across multiple nodes of a parallel computing system, according to one embodiment of the invention. When the application is running, the compute node kernel executes the instructions included in the program binary. At any given point during execution, two scenarios exist for the next instruction to execute (step 802). First, the next instruction may reside in the memory of the compute node. This is the normal case and no fault exception occurs (step 806).

The other possibility is that the next instruction does not reside in the memory of the compute node. In such a case, a code fragment exception occurs. In response, the compute node kernel determines which compute node stores the code fragment that includes the next instruction to execute. The compute node kernel then sends a message to the determined node requesting the code fragment. (step 804) In response, the compute node which has the needed code fragment transmits the fragment to the requesting node. The requesting compute node receives the message, and if necessary evicts a fragment from the fragment cache and adjusts the TLB memory mappings to reflect the presence of the just received fragment in the local memory of that node (step 806). Since the previously missing code fragment is now mapped, the application continues without fault (step 806).

While the foregoing is directed to embodiments of the present invention, other and further embodiments of the invention may be devised without departing from the basic scope thereof, and the scope thereof is determined by the claims that follow.

What is claimed is:

1. A computer-implemented method of executing an application program on a parallel computing system having a plurality of compute nodes, each node having at least a processor and a memory interconnected by at least one data communications network, comprising:
   dividing a program binary into a plurality of executable code fragments;
   distributing each of the plurality of executable code fragments to at least one of the plurality of compute nodes, wherein the plurality of compute nodes are connected by communication links forming a binary tree;
   initiating execution of the application program on the processor on each of the plurality of compute nodes;
   receiving, by at least a first compute node and a second compute node, at least a first one of the executable code fragments;
   storing the first executable code fragment in a respective memory space of the first compute node and the second compute node;
   during execution of the application program determining, by a third compute node, a need for the first executable code fragment;
   selecting, by the third compute node, to request the first executable code fragment from either the first compute node or second compute node, based on the relative distance in the binary tree between the third compute node and the respective first and second compute nodes;
   receiving, by the selected compute node, a request from a third compute node for the executable code fragment; and
   transmitting, by the selected compute node, the requested code fragment to the third compute node.

2. The computer-implemented method of claim 1, wherein the plurality of executable code fragments is distributed according to a round-robin scheme.

3. The computer-implemented method of claim 1, wherein the plurality of executable code fragments is distributed according to a user-specified scheme.

4. The method of claim 1, wherein one of the data communications network is a torroidal mesh linking each compute node to n neighboring computing nodes.

5. The computer-implemented method of claim 1, further comprising:
   receiving the code fragment transmitted from the selected compute node; and
   storing the code fragment in a memory space of the third compute node.

6. The computer-implemented method of claim 5, further comprising:
   prior to storing the received code fragment in the memory space of the third compute node, evicting a code fragment from the memory space of the third compute node.

7. A non-transitory computer readable storage medium containing a program which, when executed, performs an operation on a parallel computing system having a plurality of compute nodes, the operation comprising:
   dividing a program binary into a plurality of executable code fragments;
   distributing each of the plurality of executable code fragments to at least one of the plurality of compute nodes, wherein the plurality of compute nodes are connected by communication links forming a binary tree;
   initiating execution of the application program on each of the plurality of compute nodes;
   receiving, by at least a first compute node and a second compute node, at least a first one of the executable code fragments;
   storing the first executable code fragment in a respective memory space of the first compute node and the second compute node;
   during execution of the application program determining, by a third compute node, a need for the first executable code fragment;
   selecting, by the third compute node, to request the first executable code fragment from either the first compute node or second compute node, based on the relative distance in the binary tree between the third compute node and the respective first and second compute nodes;
   receiving, by the selected compute node, a request from a third compute node for the executable code fragment; and
   transmitting, by the selected compute node, the requested code fragment to the third compute node.

8. The computer readable storage medium of claim 7, wherein the plurality of executable code fragments is distributed according to a round-robin scheme.

9. The computer readable storage medium of claim 7, wherein the plurality of executable code fragments is distributed according to a user-specified scheme.

10. The computer readable storage medium of claim 7, wherein one of the data communications network is a torroidal mesh linking each compute node to n neighboring computing nodes.

11. The computer readable storage medium of claim 7, wherein the operation further comprises:
   receiving the code fragment transmitted from the selected compute node; and
   storing the code fragment in a memory space of the third compute node.

12. The computer readable storage medium of claim 11, wherein the operation further comprises:
   prior to storing the received code fragment in the memory space of the third compute node, evicting a code fragment from the memory space of the third compute node.

13. A parallel computing system, comprising:
   a plurality of compute nodes, each having at least a processor and a memory, wherein the plurality of compute nodes is configured to execute a parallel computing task; and
   a service node having at least a processor and a memory and a code fragmentor program, wherein the code fragmentor program is configured to:
      divide a program binary into a plurality of executable code fragments;
      distribute each of the plurality of executable code fragments to at least one of the plurality of compute nodes, wherein the plurality of compute nodes are connected by communication links forming a binary tree;
      initiate execution of the application program on each of the plurality of compute nodes,
   and wherein the execution of the program on the plurality of compute nodes includes:
      receiving, by at least a first compute node and a second compute node, at least a first one of the executable code fragments,
      storing the first executable code fragment in a respective memory of the first compute node and the second compute node,
      during execution of the application program determining, by a third compute node, a need for the first executable code fragment;
      selecting, by the third compute node, to request the first executable code fragment from either the first compute node or second compute node, based on the relative distance in the binary tree between the third compute node and the respective first and second compute nodes;
      receiving, by the selected compute node, a request from a third compute node for the executable code fragment; and receiving, by the selected compute node, a request from a third compute node for the executable code fragment, and
      transmitting, by the selected compute node, the requested code fragment to the third compute node.

14. The parallel computing system of claim 13, wherein the plurality of executable code fragments is distributed according to a round-robin scheme.

15. The parallel computing system of claim 13, wherein the plurality of executable code fragments is distributed according to a user-specified scheme.

16. The parallel computing system of claim 13, wherein one of the data communications network is a torroidal mesh linking each compute node to n neighboring computing nodes.

17. The parallel computing system of claim 13, wherein the second compute node is configured to:
   receive the code fragment transmitted from the first compute node; and
   store the code fragment in the memory of the second compute node.

18. The parallel computing system of claim 17, wherein the second compute node is configured to evict a code fragment from the memory space of the second compute node prior to storing the received code fragment in the memory of the second compute node.

* * * * *